Figure 1:
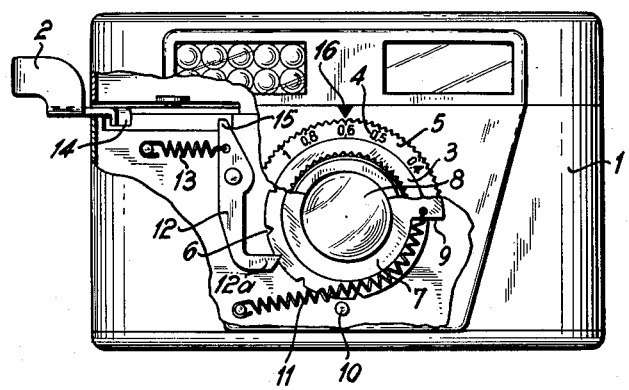

June 23, 1964   F. SCHRUMPF   3,138,082
PHOTOGRAPHIC CAMERA WITH OBJECTIVE LENS
SETTABLE TO PRE-SELECTED FOCUS
Filed Jan. 24, 1963   2 Sheets-Sheet 1

INVENTOR
Frithjof Schrumpf
By: Blum, Moscovitz,
Friedman, Blum & Kaplan
Att'ys.

INVENTOR
Frithjof Schrumpf
By- Blum, Moscovitz,
Friedman, Blum & Kaplan
Att'ys.

United States Patent Office 3,138,082
Patented June 23, 1964

3,138,082
PHOTOGRAPHIC CAMERA WITH OBJECTIVE LENS SETTABLE TO PRE-SELECTED FOCUS
Frithjof Schrumpf, Braunschweig, Germany, assignor to Voigtländer A.G., Braunschweig, Germany, a corporation of Germany
Filed Jan. 24, 1963, Ser. No. 253,599
Claims priority, application Germany Apr. 4, 1962
9 Claims. (Cl. 95—44)

This invention relates to photographic cameras provided with objective lenses capable of being set to different ranges and, more particularly, to such cameras in which the diaphragm aperture or the exposure time can be set, either semi-automatically or fully automatically, by scanning of the indicator position of an exposure meter, as through the use of a re-setting device.

In known types of semi-automatic or fully automatic cameras, range or distance setting is effected either with the aid of a range finder or by estimation with reference to a range scale. Alternatively, the maximum relative aperture of the objective lens will have been preselcted so that a very considerable depth of focus range is provided, with the objective being designed for only a single range value.

The present invention is directed to an automatic camera of the mentioned type in which range setting is greatly facilitated. In accordance with the invention, in a camera of the mentioned type, the normal or standard range settings applicable to the greatest percentage of exposures are combined with the depth of focus range appropriate to produce what is known as a "snapshot" setting. Further, other range settings of the objective lens are made possible, particularly those for new exposures.

To assure the simplified manipulation that is required in the case of an automatic camera, in accordance with the present invention settings deviating from the normal or so-called "snapshot" setting are cancelled out responsive to the performing of operating steps normally following after an exposure, such as film feeding, shutter setting, or the like, and the objective is automatically re-set to the snapshot setting value.

To effect the foregoing, the camera objective is provided with a mean setting position defined by detents, stops, or the like, and corresponding to a large depth of focus range in accordance with the diaphragm aperture setting. Means are provided to adjust the objective lens to this mean setting position, and this means is rendered effective to perform its function responsive to functional performance of the camera mechanism.

In accordance with the invention, the re-setting of the objective lens into the snapshot setting can be effected by coupling the device or means for effecting such re-setting with the device for film feeding mechanism or with the shutter release mechanism. However, other arrangements may be used whereby the objective re-setting means can be coupled with the shutter setting means, with the release movement of the shutter blades, or with the operation of the curtains in the case of focal plane shutters, and these other arrangements are within the scope of the invention.

In accordance with one embodiment of the invention, either a setting ring which is coupled with the range setting device, or the range setting device itself, is provided with detent grooves along its periphery and corresponding to various range settings. A stop lever or the like is arranged to cooperate with the detents. This stop lever is displaced from engagement with the detents by actuating the film feed device or the shutter release device following operation of the shutter, whereby the range setting device is operated to restore the objective to the snapshot setting, preferably by the use of spring bias.

If a camera embodying the invention is provided with an automatic exposure meter, it thus becomes feasible to perform the regular and most frequent exposures in a fully automatic manner without any concern about the exposure or range setting. Only in the case of extreme range settings, particularly close range pictures, it is necessary for the operator consciously to take into consideration the exposure or range setting and to provide for an additional setting of the range setting device. However, if the exposure to be taken is one of an object which is positioned within the preferred depth of focus range, the operator need not have any concern about the range setting since the preceding close-range setting is automatically cancelled.

Due to its nature, the invention arrangement is particularly adopted for use with miniature cameras having short focal length objective lenses. This is particularly true since, in the case of objective lenses of this type, there is available a large depth of focus range for the snapshot setting. However, the invention is applicable to cameras in general, including cameras not provided with any automatic exposure setting means.

Figure 2:
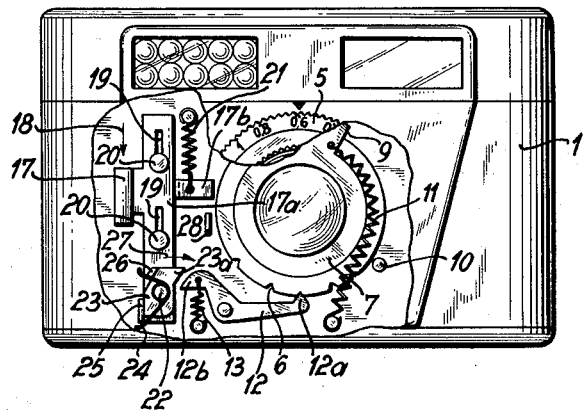
Figure 3:
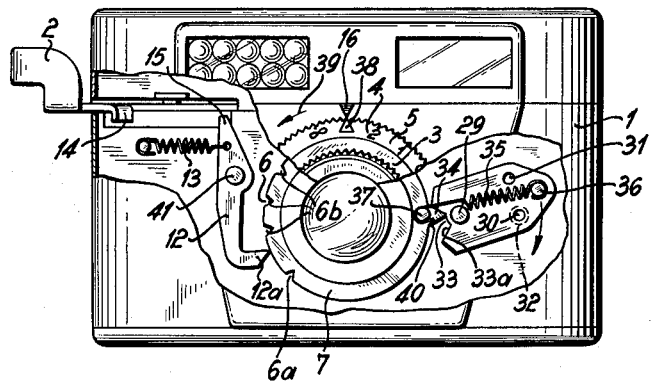

For an understanding of the principles of the invention, reference is made to the following description of typical embodiments thereof as illustrated in the accompanying drawings. In the drawings:

FIG. 1 is a front elevational view, partly in section, of a camera embodying the invention and in which the objective is automatically restored to the mean range setting responsive to operation of the film feed device;

FIG. 2 is a view similar to FIG. 1 but illustrating an embodiment of the invention in which the mentioned restoration is effected by the reverse travel of the shutter release; and FIG. 3 is a view, similar to FIGS. 1 and 2, illustrating an embodiment of the invention in which the restoration to a mean snapshot setting is effected not only from a long range setting, such as "infinity," but also from a short range setting.

Referring to FIG. 1, a camera is illustrated as having a housing or casing 1 and as including a film feed device 2. An objective lens mount 3 is either permanently or interchangeably secured to the housing or casing 1, and the objective is provided with a range or distance setting device 5 having a range or distance scale 4. The objective mount 3 is further provided with a ring 7 which is rotatable about the axis of the objective, and which is formed with detent grooves 6 around its periphery. The detent grooves 6 extend over a range coordinated with the setting for new exposures as, for example, exposures at a distance of less than "2 m." In the particular arrangement shown in FIG. 1, the depth of focus range of the objective lens 8, when fully open, should cover the range from "2 m." to "infinity." In the case of a mean or average setting, at about "5 m.," this is attained when an abutment 9 on ring 7 engages a stop 10 fixed in the camera casing. A tension spring 11 tends to rotate ring 7 in a direction to engage abutment 9 with stop 10.

A stop lever 12 is pivotally mounted, intermediate its ends, on the camera casing or housing, and has a tip or detent end 12a cooperable with the detents 6 of setting ring 7, the lever 12 being biased by a spring 13 to a position in which tip 12a is engaged in a detent 6. Film feed device or lever 2 is formed with a stop or abutment 14 which engages the upper end 15 of stop lever 12 upon completion of the film feeding stroke of the lever 2. Such engagement rocks the lever 12 to disengage its tip 12a from a detent 6.

The arrangement of FIG. 1 operates as follows. In the normal or usual position or adjustment of the objective, spring 11 biases ring 7 to a position in which abutment 9 engages stop 10. In this position, the range setting of the objective is at about the reading "5 m." which corresponds to a depth of focus range from "infinity" to about "2 m."

When an exposure is to be made at a relatively short distance, as for example at a distance of below "2 m.," then the distance or range setting device 5 is positioned, with reference to scale 4, in cooperation with the mark 16. In this position, abutment 9 or ring 7 is disengaged from stop 10 by counterclockwise rotation of ring 7, as viewed in FIG. 1, thus tensioning spring 11. The tip 12a of stop lever 12 engages in the corresponding detent or notch 6 of setting ring 7, thus releasably locking this ring against rotation due to the tension of the spring 11. After the exposure has been effected, film lever 2 is operated and its lug or abutment 14 engages the upper end of pivoted stop lever 12 so as to rock this lever clockwise, to disengage tip 12a from a detent notch 6. Spring 11 then biases ring 7 to rotate clockwise until abutment 9 engages fixed stop 10, thus restoring the range setting to "5 m."

In the arrangement shown in FIG. 2, the restoration of the range setting to the mean value is effected through the reverse stroke of the shutter release. Parts identical with those shown in FIG. 1 have been given the same reference characters. A shutter release device 17 is displaceably mounted in camera housing 1 by virtue of being mounted on a slide 17a. Slide 17a is movable in the direction of the arrow 18, and is guided in such movement by virtue of longitudinal slots 19 in slide 17 engaging headed pins or the like 20. A spring 21 biases shutter release device 17 to its upper position illustrated in FIG. 2.

On the lower end of slide 17, there is a pin or bolt 22 which pivotally supports an abutment or lug 23. A spring 24, which is engaged between a land 25 on slide 17 and a land or lug 26 on abutment 23, biases abutment 23 in the direction of the arrow 27, or clockwise as illustrated in FIG. 2. As in FIG. 1, a pivotally mounted detent lever 12 is biased by a spring 13 to engage its tip 12a with the detent notches 6 of the ring 7. This ring 7, in the same manner as in FIG. 1, is provided or formed with an abutment 9 which, under the influence of tension spring 11, is arranged to engage a fixed stop 10.

The arrangement of FIG. 12 operates as follows. When it is desired to take a short range exposure, the first operation is to set range setting device 5 which also angularly adjusts ring 7, in the same manner as described in connection with FIG. 1. Then shutter release slide 17 is moved downwardly in the direction of arrow 18. During this downward movement, the tip 23a of detent or abutment 23 pivotally mounted on slide 17a moves past an end 12b of lever 12. The engagement of tip 23a with end 12b of slide 12 tends to force this lever in the direction to maintain its tip 12a engaged in a notch 6. When slide 17a is in its lowermost position, a stop 17b thereon engages a shutter release component 28, thereby triggering the shutter. As slide 17a is returned to its cocked position under the bias of spring 21, tip 23a of detent 23 engages the underside of end 12b of lever 12. This rocks lever 12 in a clockwise direction, expanding spring 13, and tip 12a of lever 12 is disengaged from the notch 6 of setting ring 7. Thereupon, spring 11 rotates ring 7 clockwise to restore the range setting to the mean or average position as determined by engagement between abutment 9 and stop 10, and as described in connection with FIG. 1.

As stated, FIG. 3 illustrates an embodiment of the invention wherein the automatic restoring of the range setting to the mean or average value is effected both from a short range setting as well as from a long range setting, and automatically. This embodiment is particularly adaptable to cameras having long focal length objective lenses of the type wherein, upon full opening of the objective lens diaphragm, only a relatively small focal depth range is spanned. In this case, as well as in those previously described, a snapshot setting is required since, in the case of such a camera, it may be assumed, as a matter of course, that the largest number of group exposures will be taken within the range of about 3 m. to 6 m.

In FIG. 3, parts identical with those in FIGS. 1 and 2 have been given the same reference characters. Thus, camera casing 1 has an objective mount 3 thereon, and objective mount 3 is provided with range setting device 5 having a scale 4 which can be adjusted relative to a mark 16 fixed on housing 1. Setting device 10 is again coupled with setting ring 7 which is formed with detent notches 6. In the same manner as in the embodiments of FIGS. 1 and 2, a stop lever 12, pivoted intermediate its ends, has tip 12a engageable with the notches 6, stop lever 12 being pivoted to the camera housing about a pin 41 and being biased by a spring 13 to move in a counterclockwise direction to engage tip 12a with notches 6.

In the same manner as described in connection with FIG. 1, a film feed device or lever 2 is provided on the camera, and has abutment 14 which, at the end of the stroke of the film feed device, engages the upper end 15 of stop lever 12 to disengage tip 12a from a notch 6 of setting ring 7.

Mounted on the housing 1 is a rocker 28 which may be rocked about a bolt or pin 29 fixed to the housing, and rocker 28 has two spherical depressions 30 and 31 cooperable with a ball 32, indicated by a broken line, and spring biased into engagement with the recesses 30 or 31. On the end of rocker 28 facing setting ring 7, there is formed a notch or recess 33 which is engageable with a detent or abutment 34 projecting radially outwardly from ring 7. A spring 35 has one end fixed to a pin 36 on the outer end of the rocker 28, and its other end fixed to a pin 37 on ring 7 adjacent detent 34. Pins 36 and 37 are positioned, with respect to each other and with respect to spherical detents 30 and 31 of rocker 28, that spring 35 exerts tension on setting ring 7 in either one of the two positions of rocker 28.

The arrangement of FIG. 3 operates as follows. In the most used range setting, mark 16 on housing 1 is adjacent a scale mark 38 which corresponds to the snapshot setting. Should the camera user wish to take a picture at a relatively close range, or at a relatively long range, neither of which corresponds to the normal setting, setting device 5 is turned far enough for mark 16 to be opposite a scale value corresponding to the desired range setting. At the same time as device 5 is moved, setting ring 7, which is coupled therewith, is also rotated so that tip 12a of stop lever 12 will engage one of the notches 6. Thus, for "infinite" setting, tip 12a will engage a notch 6a, and in the case of a very small distance setting, tip 12a will engage a notch 6b. Accordingly, using the snapshot position as an initial setting, as shown in FIG. 3, setting device 5 can be rotated in either direction and the snapshot setting will be restored upon actuation of film feed lever 2.

If, for example, an exposure is to be taken at a distance not corresponding to the position of the parts shown in FIG. 3, setting device 5 is rotated in the direction of arrow 39, whereupon pointer 34 of ring 7 swings across recess 33 of rocker 28 to oscillate the rocker 28 from the illustrated position to a position in which spherical recess 31 is engaged with ball 32. The movement of rocker 28 to this position in which recess 31 is engaged with the ball 38 is effected under this influence of spring 35 after predetermined angular movement of ring 7 in a counterclockwise direction. Tip 12a of lever 12 will engage one of the detent grooves 6b, and spring 35 is expanded an amount in accordance with the particular short distance range setting. Upon actuation of film feed lever 2, abutment 14 will engage the upper end of lever 15 to rock this lever and disengage its tip 12a from a notch 6b. Under the influence of spring 35, ring 7 and range setting device 5 will be rotated in a clockwise direction until edge 40 of abutment 34 of ring 7 engages edge 33a of recess 33. This stops further movement of ring 7 and thus further movement of setting device 5.

If, on the next exposure, it is desired to have a distance setting of "infinity," setting device 5 is rotated in a direction opposite to arrow 39. Rocker 28 is thus snapped into the position illustrated in FIG. 3, with spring 35 tending to rotate ring 7 in a counterclockwise direction. The parts are restored to the snapshot setting as tip 12a is disengaged from a notch 6a upon rocking of lever 12 due to engagement by abutment 14 of film feed lever 2 upon actuation of the latter. Ring 7 is rotated in a counterclockwise direction, under the influence of charged spring 35, until pointer 34 engages the upper edge of notch 33, as viewed in FIG. 3.

It should be understood that, in the embodiment of the invention shown in FIG. 3, release of stop lever 12, by disengagement of its tip 12a from a notch 6a or one of the notches 6b, can also be effected in the manner shown in FIG. 2, as by the reverse movement of the shutter release slide.

While specific embodiments of the invention have been shown and described in detail to illustrate the application of the principles of the invention, it will be understood that the invention may be embodied otherwise without departing from such principles.

What is claimed is:

1. In a photographic camera having instrumentalities normally operated sequential to the making of an exposure: an objective adjustable as to range setting, and having a mean range setting with an extended depth of focus range coordinated with the diaphragm aperture setting; setting means coupled to said objective for adjusting the range setting thereof; means biasing said setting means to said mean range setting; detent means operable to releasably latch said setting means in range settings other than said mean range setting; and release means operatively associated with one of said instrumentalities and effective, responsive to operation of the latter sequential to the making of an exposure, to operate said detent means to release said setting means for return to said mean range setting under the influence of said biasing means.

2. In a photographic camera, as claimed in claim 1, one of said instrumentalities being a film feed mechanism; said release means being operatively associated with said film feed mechanism and effective to release said setting means upon movement of said film feed mechanism in a film feeding direction.

3. In a photographic camera, as claimed in claim 1, said instrumentalities including a shutter release mechanism movable, in one direction, to release the shutter to make an exposure and, in the reverse direction, to re-set the shutter; said release means being operatively associated with said shutter release mechanism and effective, upon movement of the latter in such reverse direction, to release said setting means.

4. In a photographic camera, as claimed in claim 1, said setting means comprising a setting device rotatable about the axis of said objective; a setting ring coupled with said setting device for rotation thereof; said setting ring having notches spaced circumferentially of its periphery and each corresponding to one of said other range settings; said detent means comprising a pivotally mounted lever having a detent end engageable in said notches; and means biasing said lever to engage its detent end in one of said notches; said release means operating said lever in a direction to disengage its detent end from the associated notch.

5. In a photographic camera, as claimed in claim 4, said lever being pivoted intermediate its ends; said release means comprising a stop movable with said one instrumentality and engageable with the opposite end of said lever to rock said lever to disengage its detent end from the associated notch.

6. In a photographic camera, as claimed in claim 5, said instrumentalities including a film feed lever; and a stop on said lever; said other end of said detent lever projecting into the path of movement of said stop, and said stop engaging said other end of said detent lever upon movement of said film feed lever in a film feeding direction to rock said detent lever to release said setting means.

7. In a photographic camera, as claimed in claim 5, said instrumentalities including a shutter release device having a slide movable in one direction to release the shutter and in the reverse direction to re-set the shutter; said release means comprising a dog pivoted on said slide; means biasing said dog to project from said slide to engage said other end of said detent lever; stop means on said slide engageable with said dog and providing for swinging movement thereof, upon engagement with said other end of said detent lever, during movement of said slide in a shutter release direction; whereby said dog is ineffective to rock said lever; said stop means preventing movement of said dog in the opposite direction, upon engagement of said dog with said other end of said detent lever during movement of said slide in the reverse direction, whereby said dog will then rock said detent lever to release said setting ring.

8. In a photographic camera as claimed in claim 5, said setting ring having an outwardly tapered abutment projecting radially therefrom; a rocker oscillatably mounted adjacent said setting ring and having a recess facing said tapered abutment to receive the latter; a pair of detent devices operable to releasably maintain said rocker in either one of a pair of operated positions; and a tension spring connected between said setting ring and a portion of said rocker outwardly of the pivot axis of the latter; said tapered abutment, upon movement of said setting ring in one direction, rocking said rocker to one of its operated positions and, upon return movement of said setting ring in the opposite direction, engaging an edge of said recess to rock said rocker to its other operated position to form a stop for said tapered abutment.

9. In a photographic camera as claimed in claim 5, an abutment projecting from said setting ring; and a fixed abutment engageable by said first-named abutment when said setting ring is in said mean range setting.

No references cited.